United States Patent
Bencsik et al.

(10) Patent No.: US 11,628,809 B2
(45) Date of Patent: Apr. 18, 2023

(54) WIPER BLADE ADAPTER DEVICE

(71) Applicant: Robert Bosch GmbH, Stuttgart (DE)

(72) Inventors: Barnabas Bencsik, Val (HU); Godelieve Kraemer, Huegelsheim (DE); Koen Lammens, Heverlee (BE); Stijn Truyens, Tienen (BE); Hubert Verelst, Tienen (BE); Marcello Bubba, Linden (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/734,580

(22) Filed: May 2, 2022

(65) Prior Publication Data

US 2022/0258696 A1  Aug. 18, 2022

Related U.S. Application Data

(63) Continuation of application No. 16/313,238, filed as application No. PCT/EP2017/064376 on Jun. 13, 2017, now Pat. No. 11,318,913.

(30) Foreign Application Priority Data

Jun. 22, 2016 (DE) ..................... 10 2016 211 162.0

(51) Int. Cl.
*B60S 1/38* (2006.01)
*B60S 1/40* (2006.01)

(52) U.S. Cl.
CPC ........... *B60S 1/3849* (2013.01); *B60S 1/3863* (2013.01); *B60S 1/3867* (2013.01); *B60S 1/4083* (2013.01);

(Continued)

(58) Field of Classification Search
CPC ........ B60S 1/40; B60S 1/3848; B60S 1/3851; B60S 1/3853; B60S 1/3858; B60S 1/3865;

(Continued)

(56) References Cited

U.S. PATENT DOCUMENTS

| 3,416,180 A | 12/1968 | Deutscher et al. |
| 2014/0033467 A1 | 2/2014 | Obert et al. |

FOREIGN PATENT DOCUMENTS

| CN | 1646354 A | 7/2005 |
| CN | 101111415 A | 1/2008 |

(Continued)

OTHER PUBLICATIONS

English translation of description portion of Japanese publication 2003-054384, published Feb. 2003. (Year: 2003).*

(Continued)

*Primary Examiner* — Gary K. Graham
(74) *Attorney, Agent, or Firm* — Michael Best & Friedrich LLP

(57) ABSTRACT

The invention is based on a wiper blade adapter device with an adapter basic body (10) which is provided to be fixedly connected to a wiper blade component (12), and with an adapter unit (14) which is provided for releasable coupling to a wiper arm adapter (16), and wherein the adapter unit (14) is provided to be connected to the adapter basic body (10) via a latching connection. It is proposed that the adapter unit (14) comprises at least one latching means (18) for latching to the adapter basic body (10), said latching means being provided to be at least partially deflected in the direction of a longitudinal centre plane (22) of the adapter unit (14) during assembly with the adapter basic body (10).

20 Claims, 4 Drawing Sheets

(52) U.S. Cl.
CPC ........... *B60S 1/4087* (2013.01); *B60S 1/3848* (2013.01); *B60S 1/40* (2013.01)

(58) Field of Classification Search
CPC .... B60S 1/3867; B60S 1/3868; B60S 1/3863; B60S 1/4087; B60S 1/4083; B60S 1/4006; B60S 2001/4012
See application file for complete search history.

(56) References Cited

FOREIGN PATENT DOCUMENTS

| | | |
|---|---|---|
| CN | 10213168 A | 7/2011 |
| CN | 103228500 A | 7/2013 |
| DE | 102013220255 A1 | 4/2015 |
| EP | 2179901 A2 | 4/2010 |
| JP | 2003054384 A | 2/2003 |
| JP | 2003312451 A | 11/2003 |
| JP | 2005119453 A | 5/2005 |
| WO | 2013186111 A1 | 12/2013 |

OTHER PUBLICATIONS

International Search Report for Application No. PCT/EP2017/064376 dated Aug. 17, 2017 (English translation, 2 pages).

\* cited by examiner

WIPER BLADE ADAPTER DEVICE

CROSS REFERENCE TO RELATED APPLICATIONS

This application is a continuation of U.S. application Ser. No. 16/313,238, filed Dec. 26, 2018, which is a 371 of PCT/EP2017/064376, filed Jun. 13, 2017, and claims priority to DE 102016211162.0, filed Jun. 22, 2016, the entire contents of each of which are incorporated herein by reference.

BACKGROUND OF THE INVENTION

There has already been proposed a wiper blade adapter device having an adapter base member which is provided to be securely connected to a wiper blade component and having an adapter unit which is provided for releasable coupling to a wiper arm adapter, and wherein the adapter unit is provided to be connected to the adapter base member by means of a locking connection.

SUMMARY OF INVENTION

The invention is based on a wiper blade adapter device having an adapter base member which is provided to be securely connected to a wiper blade component and having an adapter unit which is provided for releasable coupling to a wiper arm adapter, and wherein the adapter unit is provided to be connected to the adapter base member by means of a locking connection.

It is proposed that the adapter unit comprise at least one locking means for engagement with the adapter base member, which is provided, during assembly with the adapter base member, to be deflected at least partially in the direction of a longitudinal center plane of the adapter unit. It is thereby possible for the at least one locking means to be deflected in a particularly force-saving manner and at the same time to provide a high level of operational reliability. A structural height of the adapter unit can advantageously be kept particularly small. The adapter base member advantageously forms side claws which are provided for engaging around resilient rails of a wiper blade. Preferably, the wiper blade adapter device is part of a wiper blade.

The adapter base member is preferably at least substantially, in a particularly preferred manner completely, formed from a plastics material. The term "at least substantially formed" is in this context, with respect to a volume and/or a mass proportion, intended to be understood to be constructed in particular at a level of more than 50%, preferably more than 80%, in a particularly preferred manner more than 95%. The term "fixedly connected" is intended in this context to be understood in particular to be a non-releasable connection of at least two elements which is provided to be released only by means of an at least partial destruction of at least one component and/or by means of a special tool and/or by means of a technical operator. A "wiper blade component" is in this context intended in particular to be understood to be a component of a wiper blade, such as, in particular, a resilient rail, a wiper strip, a wiper lip and/or a wind deflection element.

A "locking means" is in this context intended to be understood to be in particular a resilient means for producing a locking connection which is provided during assembly from a starting position to be resiliently deflected counter to a resilient force. The locking means is in particular provided, during the assembly with the adapter base member, to be deflected at least partially in the direction of a longitudinal center plane of the adapter unit counter to a resilient force. In particular the locking means is provided, during assembly with the adapter base member, to be deflected at least partially in the direction toward the longitudinal center plane of the adapter unit counter to a resilient force. Preferably, the locking means moves when an end assembly position is reached back into the starting position by means of the resilient force. The term "adapter unit" in this context is in particular intended to be understood to be a unit which is provided to provide a coupling region for a coupling and/or contacting with a wiper arm adapter. The term "wiper arm adapter" is in this context intended in particular to be understood to be an adapter which has a contact region with a wiper arm component and which is connected to the wiper arm component in a non-releasable manner and which is provided to provide a coupling region of the wiper arm component for a coupling and/or a contacting with a wiper blade adapter. Advantageously, the wiper arm adapter forms an end region of a wiper rod. In a further advantageous manner, the wiper arm adapter is constructed integrally with the wiper rod. The term "integrally" is intended in particular to be understood to be connected in a materially integral manner, such as, for example, by means of a welding process and/or adhesive bonding process, etcetera, and in a particularly advantageous manner formed on, such as, by means of production from a cast and/or by means of production in a single or multi-component injection-molding method.

The term "in the direction of a longitudinal center plane" is intended in this context to be understood in particular to mean that a direction component of a movement extends perpendicularly to the longitudinal center plane. The term "longitudinal center plane" is intended in this context in particular to be understood to be a notional plane which extends perpendicularly to a wiping direction and which extends through a geometric center point and/or a center of gravity of the adapter base member. The wiping direction extends at least substantially parallel with a deflection direction of the at least one locking means. In particular, the longitudinal center plane is located at least substantially perpendicularly to a surface which is intended to be wiped. The term "at least substantially parallel or perpendicular" is intended in this context to be understood in particular to be a deviation of less than 30°, preferably less than 10° and in a particularly preferred manner less than 5°. In particular, the longitudinal center plane extends in a longitudinal direction of the adapter base member. The term "longitudinal direction" of an object is in this instance intended in particular to be a direction which extends parallel with a longest edge of a smallest geometrical cuboid which the object still completely surrounds. The wiping direction extends in particular perpendicularly to the longitudinal direction and parallel with the surface which is intended to be wiped. The term "provided" is in particular intended to be understood to be specially configured and/or equipped. The fact that an object is provided for a specific function is intended in particular to be understood to mean that the object performs and/or carries out this specific function in at least one application and/or operating state.

In another embodiment of the invention, it is proposed that the adapter unit comprise at least one additional locking means for engagement with the adapter base member which is provided, during assembly with the adapter base member, to be deflected at least partially in the direction of the at least one locking means. A particularly reliable securing between the adapter unit and the adapter base member can thereby be achieved. Preferably, the at least one additional locking means is provided, during assembly with the adapter base member, to be at least partially deflected in the direction of the at least one locking means counter to a resilient force. In particular, the locking means and the additional locking means are provided to be moved toward each other counter to a resilient force when assembled.

Furthermore, it is proposed that the at least one locking means and the at least one additional locking means each comprise an abutment face for abutment against the wiper arm adapter which in a non-deflected state have a spacing with respect to each other which at least substantially corresponds to a width of the wiper arm adapter. The term "at least substantially correspond" is intended in this context to be understood to mean in particular with a deviation of less than 5%, preferably less than 1%.

It is thereby possible to construct a coupling region for the wiper arm adapter in a particularly compact and stable manner. An operational reliability can advantageously be increased since the wiper arm adapter reliably blocks an undesired deflection of the at least one locking means. It is thereby possible for the at least one locking means to be constructed in a particularly advantageous manner with a high level of flexibility for a particularly simple assembly, wherein at the same time operational reliability can be increased. A construction height of the wiper blade adapter device can advantageously be kept small.

It is further proposed that the at least one locking means be provided to move into lateral abutment with the wiper arm adapter during assembly. It is thereby possible to achieve a particularly stable receiving of the wiper arm adapter. The term "lateral abutment" is intended in this context in particular to be understood to be a direct abutment which forms at least one positive-locking connection in the wiping direction.

It is further proposed that the at least one locking means and the at least one additional locking means define a receiving space for positive-locking receiving of the wiper arm adapter. It is thereby possible for one of the wiper arm adapters to be received in a particularly simple manner and at the same time for a reliable securing of the locking connection to be achieved. The term "define" is intended in this context to mean in particular delimit at least at two opposing sides.

It is further proposed that the adapter unit comprise at least one side wall which is provided to cover the at least one locking means at least in one wiping direction. The at least one locking means can thereby advantageously be protected from weather influences. Furthermore, particularly good aerodynamics can be achieved. In addition, a high level of aesthetics of the wiper blade adapter device can be achieved.

In addition, it is proposed that the abutment faces define relative to a wiping direction an angle of at least substantially 45°. The adapter unit can thereby advantageously be constructed in a particularly compact manner. Furthermore, a wiper arm adapter which is positioned obliquely relative to the surface to be wiped can be received in a particularly secure manner.

There is further proposed a system having a wiper blade adapter device according to the invention and having a wiper arm adapter which is provided to block a deflection of the at least one locking means in an assembled state. It is thereby possible to achieve a particularly reliable wiper operation, in particular even at high travel speeds and/or with a dirty or iced vehicle windshield.

There is further proposed a method for assembling a wiper blade adapter device according to the invention with a wiper arm adapter, wherein at least one locking means of an adapter unit of the wiper blade adapter device is deflected during the assembly in the direction of a longitudinal center plane of the adapter unit. A particularly simple and reliable assembly of the wiper blade adapter device with the wiper arm adapter can thereby be achieved. Advantageously, the at least one locking means is blocked after assembly in the direction of the longitudinal center plane by the wiper arm adapter.

The wiper blade adapter device according to the invention is not intended in this instance to be limited to the application and embodiment described above. In particular, the wiper blade adapter device according to the invention in order to carry out an operating method described herein may have a number of individual elements, components and units which differs from a number mentioned herein.

BRIEF DESCRIPTION OF THE DRAWINGS

Further advantages will be appreciated from the following description of the drawings. In the drawings, an embodiment of the invention is illustrated. The drawings, the description and the claims contain numerous features in combination. The person skilled in the art will advantageously also consider the features individually and combine them to form other advantageous combinations.

In the drawings.

DETAILED DESCRIPTION

Figure 1:
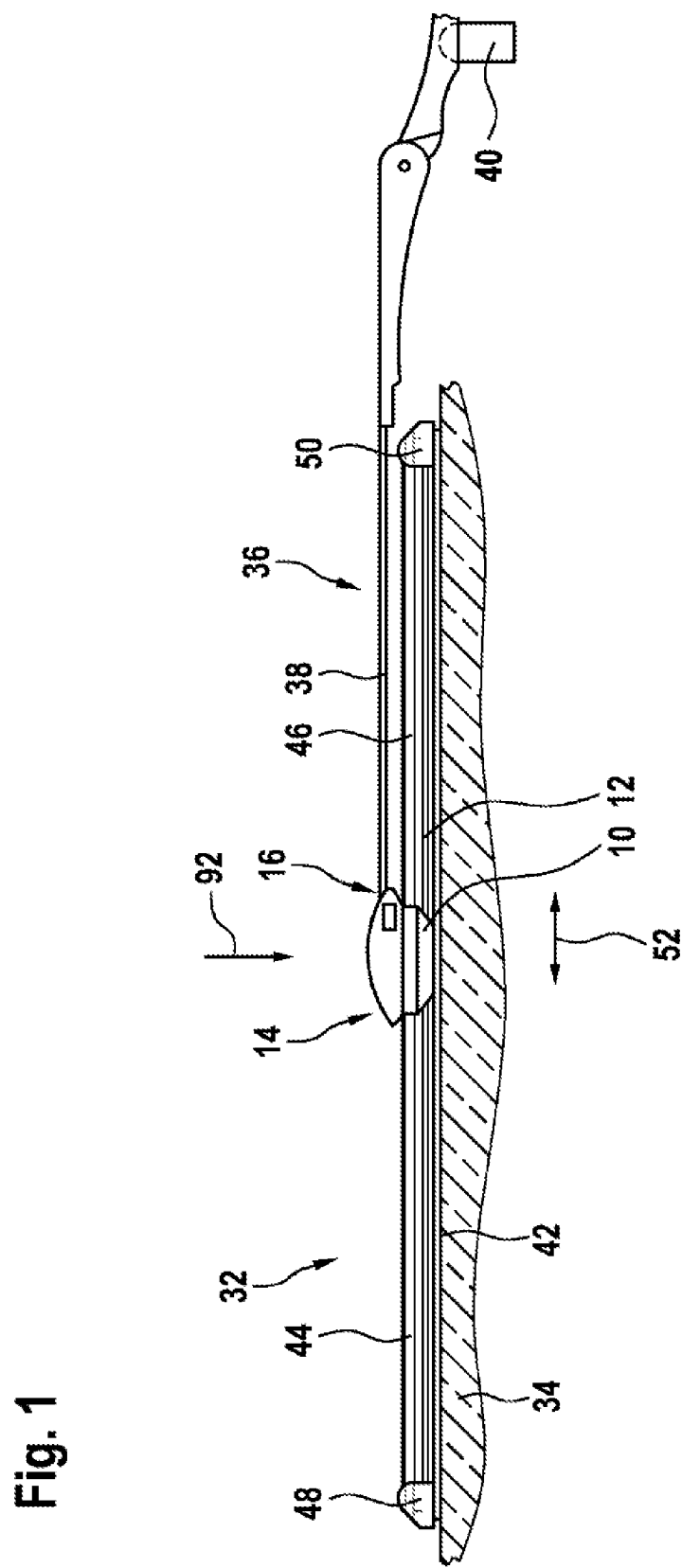
FIG. 1 is a schematic side view of a wiper blade with a wiper blade adapter device and a wiper arm.

In FIG. 1, a wiper blade 32 having a wiper blade adapter device is illustrated schematically. In particular, a sizing of the components shown may in this instance differ from the schematic illustration. The wiper blade 32 forms a flat wiper blade. The wiper blade 32 is provided for cleaning a vehicle windshield 34. The wiper blade 32 is releasably coupled to a wiper arm 36. The wiper arm 36 has a wiper arm adapter 16. The wiper arm 36 has a wiper rod 38. The wiper arm adapter 16 forms an end region of the wiper rod 38. The wiper arm 36 is provided for securing to a drive shaft 40. The drive shaft 40 is constructed so as to be able to be rotated in an oscillating manner by means of a drive motor which is not illustrated in greater detail.

The wiper arm 36 and the wiper blade 32 which is mounted thereon can be driven in an oscillating manner in a pivot movement over the vehicle pane 34. In a wiping operation, a wiper lip 42 of the wiper blade 32 passes over the vehicle pane 34. The wiper blade 32 has a first wind deflection element 44. The first wind deflection element 44 is provided for deflecting travel wind and for producing a pressing force of the wiper blade 32 in the direction of the vehicle pane 34. The first wind deflection element 44 extends almost over half of an entire length extent of the wiper blade 32. The wiper blade 32 has a second wind deflection element 46. The second wind deflection element 46 is constructed separately from the first wind deflection element 44. The first wind deflection element 44 and the second wind deflection element 46 are constructed in a mirror-symmetrical manner with respect to each other. The second wind deflection element 46 is provided for deflecting travel wind and for producing a pressing force of the wiper blade 32 in the direction of the vehicle pane 34. The second wind deflection element 46 extends practically over half of the entire length extent of the wiper blade 32. The wiper blade 32 has two end caps 48, 50. The end caps 48, 50 are arranged at opposing free ends of the wiper blade 32. The end caps 48, 50 terminate the wiper blade 32 in a longitudinal direction 52. The longitudinal direction 52 extends in a mounted state at least substantially parallel with a main length extent direction of the wiper blade 32.

The wiper blade adapter device comprises an adapter unit 14. The adapter unit 14 is provided for releasable coupling with the wiper arm adapter 16. The wiper arm adapter 16 is provided for introduction into the adapter unit 14.

Figure 2:
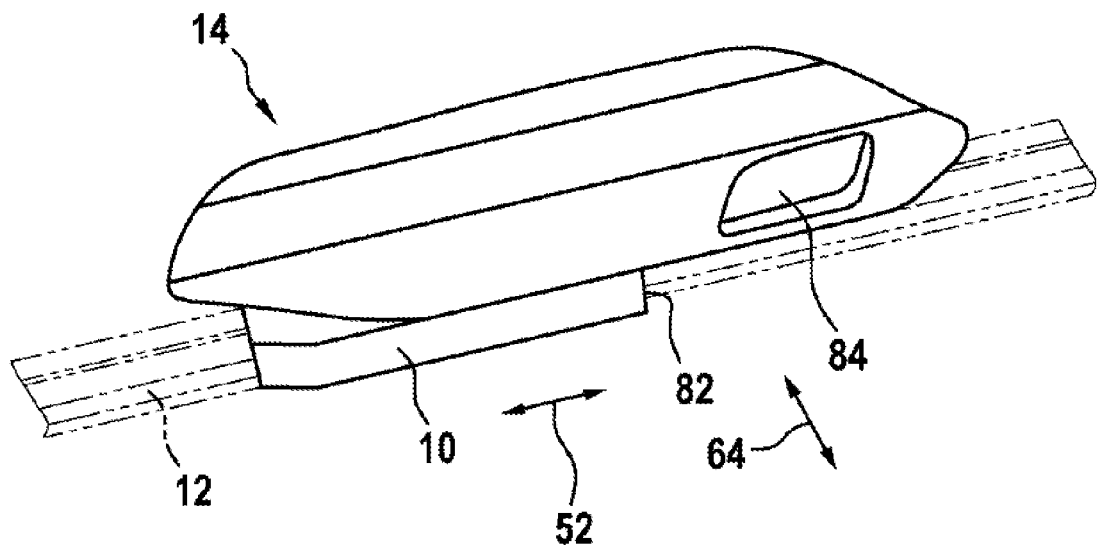
FIG. 2 is a perspective view of the wiper blade adapter device and a wiper blade component.

The wiper blade adapter device is illustrated in greater detail in FIG. 2. The wiper blade adapter device has an adapter base member 10. The adapter base member 10 is provided to be securely connected to a wiper blade component 12. The wiper blade component 12 constitutes in this instance a two-part resilient rail. In this context, however, it is also conceivable for the wiper blade component 12 to constitute a different component of the wiper blade 32 which appears advantageous to the person skilled in the art. Additional wiper blade or wiper arm components are not illustrated for reasons of clarity.

Figure 3:
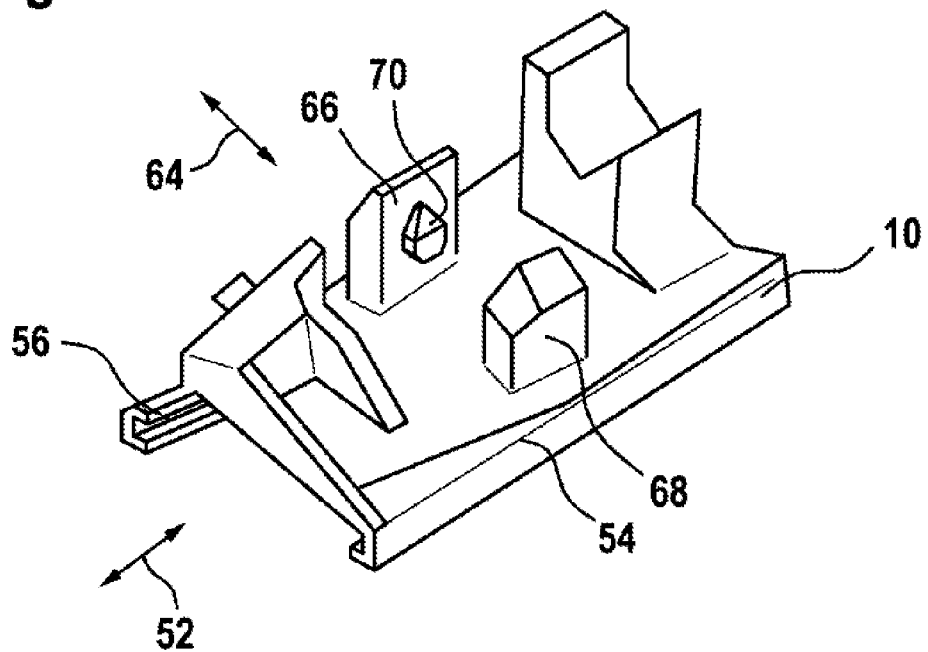
FIG. 3 is a perspective view of an adapter base member of the wiper blade adapter device.

The adapter unit 14 is provided to be connected to the adapter base member 10 by means of a locking connection. The adapter base member 10 is constructed from a plastics material. The adapter unit 14 is constructed from a plastics material. The adapter base member 10 forms side claws 54, 56 (FIG. 3). The side claws 54, 56 are provided for engagement around the wiper blade component 12.

Figure 4:
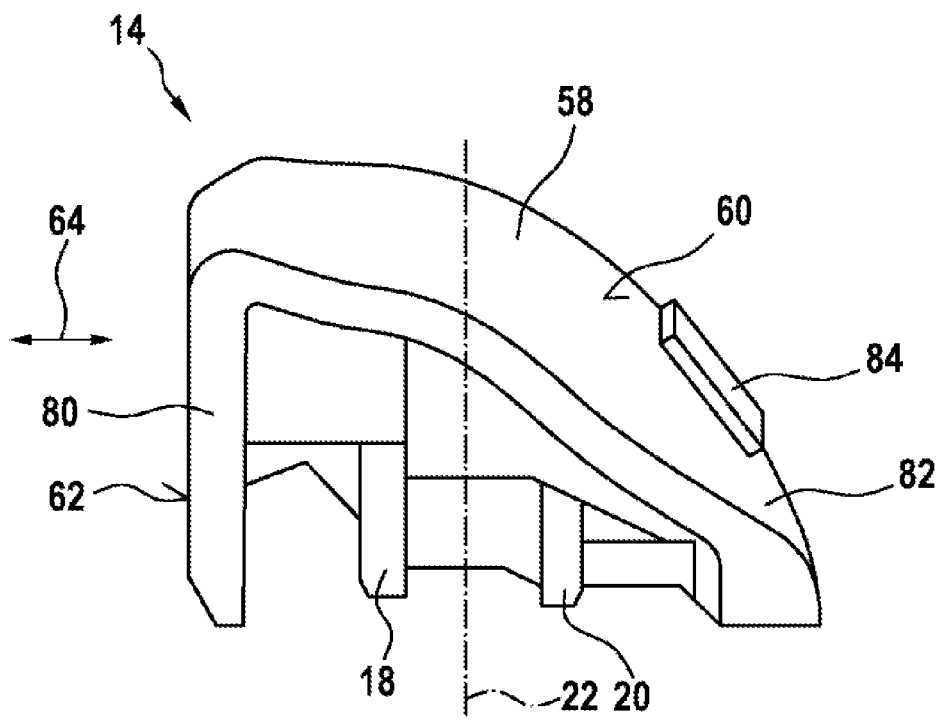
FIG. 4 is a front view of an adapter unit of the wiper blade adapter device.

As shown in FIG. 4, the adapter unit 14 comprises a locking means 18 for engagement with the adapter base member 10. The locking means 18 is constructed integrally with a base member 58 of the adapter unit 14. In this context, however, it is also conceivable for the locking means 18 to be connected to the base member 58 in a positive-locking and/or non-positive-locking manner. Furthermore, the adapter unit 14 comprises an additional locking means 20 for engagement with the adapter base member 10. The additional locking means 20 is constructed integrally with the base member 58 of the adapter unit 14. In this context, however, it is also conceivable for the additional locking means 20 to be connected to the base member 58 in a positive-locking and/or non-positive-locking manner. The base member 58 forms a wind flow face 60. The wind flow face 60 is constructed in at least partially convex manner. At the back, the base member 58 forms a rear side 62 which extends at least substantially perpendicularly to a wiping direction 64. The adapter unit 14 comprises an actuation element 84. The actuation element 84 is provided to be activated manually and in this instance to release a locking connection which is not shown in greater detail between the wiper arm adapter 16 and the adapter unit 14. The wiper arm adapter 16 can thereby be removed from the wiper blade adapter device.

The locking means 18 is provided during assembly with the adapter base member 10 to be deflected in the direction of a longitudinal center plane 22 of the adapter unit 14. The additional locking means 20 is provided, during assembly with the adapter base member 10, to be deflected in the direction of a longitudinal center plane 22 of the adapter unit 14. The longitudinal center plane 22 is a notional plane which extends perpendicularly to the wiping direction 64 and which extends through a center of gravity 90 of the adapter base member 10.

The additional locking means 20 is provided, during assembly with the adapter base member 10, to be deflected in the direction of the locking means 18. More specifically, the additional locking means 20 is provided, during assembly with the adapter base member 10, to be deflected in the direction of the locking means 18 counter to a resilient force. The resilient force is produced by a material deformation as a result of the deflection of the respective locking means 18, 20. The resilient force acts counter to the deflection of the respective locking means 18, 20. The locking means 18 and the additional locking means 20 are consequently provided during assembly to be moved toward each other counter to a resilient force.

Figure 5:
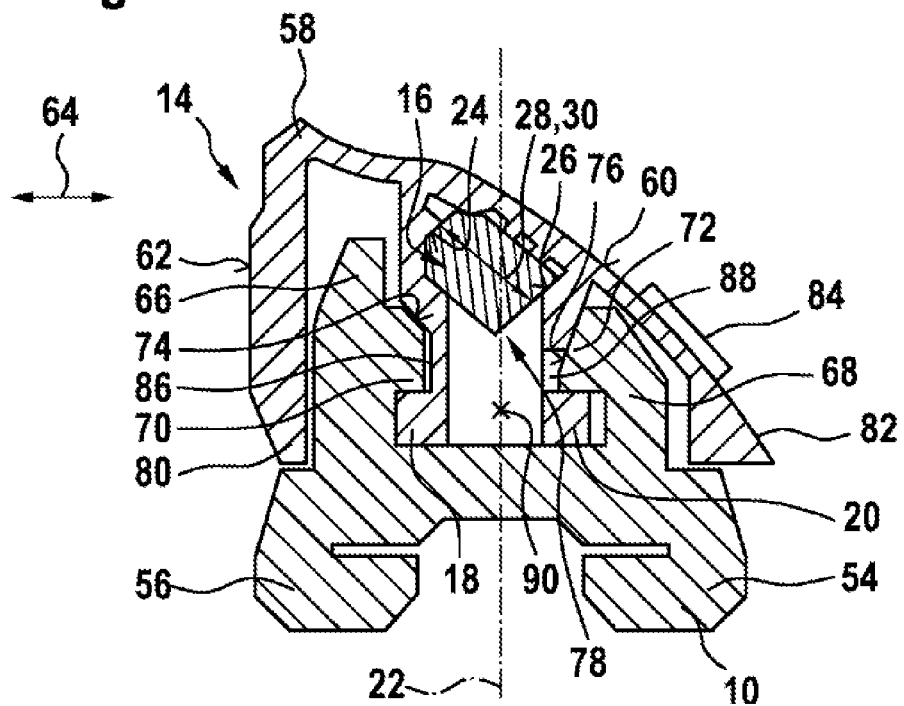
FIG. 5 is a sectioned illustration of the adapter unit and the adapter base member and FIG. 6 is a perspective view of the wiper blade adapter device.

As shown in FIG. 5, the adapter base member 10 has for deflecting the locking means 18, 20 two connection elements 66, 68. The connection elements 66, 68 are constructed in a rigid manner when considered macroscopically. The connection elements 66, 68 are consequently not provided to be deflected. The connection elements 66, 68 each have a deflection means 70, 72. The deflection means 70, 72 are arranged at sides of the connection elements 66, 68 facing each other. The deflection means 70, 72 are constructed integrally with the connection elements 66, 68. The deflection means 70, 72 each have a deflection face 74, 76 which are in each case provided to deflect the locking means 18, 20 during the assembly. The deflection faces 74, 76 are arranged obliquely with respect to the longitudinal center plane 22. More specifically, the deflection faces 74, 76 extend perpendicularly to a straight line which defines an acute angle relative to the wiping direction 64 and which at least substantially defines a right angle with respect to the longitudinal direction 52.

The locking means 18 and the additional locking means 20 comprise in each case an abutment face 24, 26 for abutment on the wiper arm adapter 16. The abutment faces 24, 26 have in a non-deflected state a spacing 28 with respect to each other which corresponds to a width 30 of the wiper arm adapter 16. The abutment faces 24, 26 define relative to the wiping direction 64 an angle of at least substantially 45°. The locking means 18 is provided during assembly to move into lateral abutment with the wiper arm adapter 16. The additional locking means 20 is provided during assembly to move into lateral abutment with the wiper arm adapter 16. The locking means 18 and the additional locking means 20 define a receiving space 78 for receiving the wiper arm adapter 16 in a positive-locking manner.

The locking means 18 and the additional locking means 20 have in each case a locking recess 86, 88. The locking recess 86 of the locking means 18 is open in a direction facing away from the longitudinal center plane 22. The locking recess 86 is provided for partially receiving the deflection means 70. The locking recess 88 of the additional locking means 20 extends completely through the additional locking means 20 in the wiping direction. The locking recess 88 is provided for partially receiving the deflection means 72.

Figure 6:
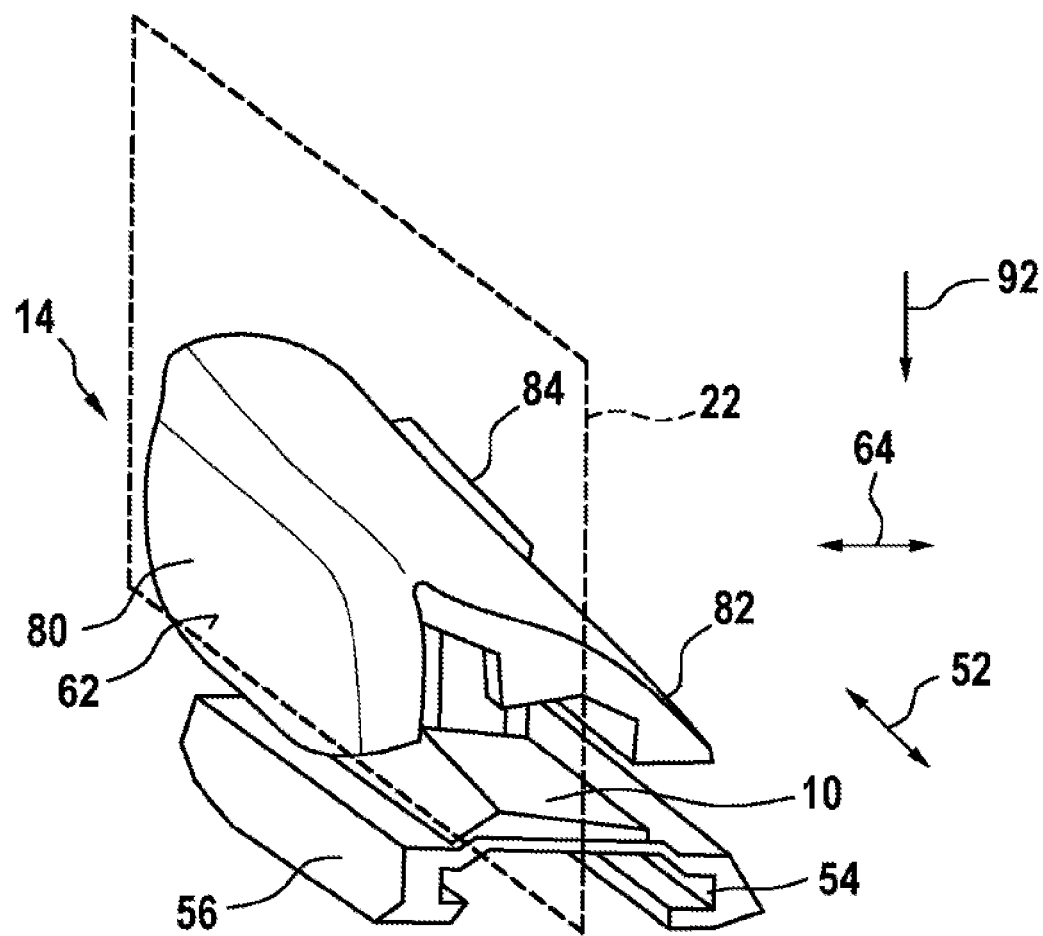

As further shown in FIG. 6, the adapter unit 14 comprises a side wall 80. The side wall 80 extends at least substantially perpendicularly to the wiping direction 64. The side wall 80 terminates the adapter unit 14 in the wiping direction 64. The adapter unit 14 comprises an additional side wall 82. The additional side wall 82 extends at least substantially perpendicularly to a straight line which defines an acute angle with respect to the wiping direction 64. The additional side wall 82 terminates the adapter unit 14 in the wiping direction 64. The side wall 80 is provided to cover the locking means 18 in the wiping direction 64. The additional side wall 82 is provided to cover the additional locking means 20 in the wiping direction 64. The locking means 18, 20 are arranged between the side walls 80, 82.

The wiper blade adapter device forms a system with the wiper arm adapter 16, wherein a deflection of the locking means 18 in an assembled state is blocked by the wiper arm adapter 16. In the system, a deflection of the additional locking means 20 in the assembled state is also blocked by the wiper arm adapter 16.

The assembly operation of the adapter unit 14 with the adapter base member 10 and the wiper arm adapter 16 is explained in greater detail below. The adapter base member 10 is already securely connected to the wiper blade component 12. The adapter unit 14 is guided in a vertical direction 92 on the adapter base member 10. The vertical direction 92 is perpendicular to the wiping direction 64 and perpendicular to the longitudinal direction 52. The vertical direction 92 faces in an operating state in the direction of the vehicle pane 34.

The locking means 18, 20 move into abutment with the deflection means 70, 72 and are deflected by them in such a manner that they move toward each other from a starting position counter to a resilient force. In an end position, the locking means 18, 20 move resiliently back into the starting position and engage behind the deflection means 70, 72. Finally, the wiper arm adapter 16 is guided between the locking means 18, 20. The wiper arm adapter 16 moves in this instance into abutment with the locking means 18, 20. In an end assembly position, the locking means 18 and the additional locking means 20 are blocked in the direction of the longitudinal center plane 22 by the wiper arm adapter 16.

The invention claimed is:

1. A wiper blade adapter device comprising:
an adapter base member (10) which is configured to be securely connected to a wiper blade component (12), the adapter base member (10) having a connection element (66, 68); and
an adapter unit (14) which is configured for releasable coupling to a wiper arm adapter (16), wherein the adapter unit (14) is configured to be connected to the adapter base member (10),
wherein the adapter unit (14) includes a locking means (18, 20) for engagement with the connection element (66, 68) of the adapter base member (10), wherein the locking means (18, 20) includes an elongate arm, wherein a distal end of the elongate arm is configured, during assembly with the adapter base member (10), to be deflected at least partially along a wiping direction (64) toward a longitudinal center plane (22) of the adapter unit (14), wherein the longitudinal center plane (22) extends through a center of gravity (90) of the adapter base member (10), wherein the wiping direction (64) extends perpendicular to the longitudinal center plane (22),
wherein the adapter base member (10) includes an inner surface facing the longitudinal center plane (22), wherein the distal end of the elongate arm is configured to snap back toward the inner surface of the adapter base member (10) and engage the inner surface of the adapter base member (10) after being deflected, and
wherein the adapter unit (14) includes an inner surface facing the longitudinal center plane (22), wherein the inner surface of the adapter unit (14) is configured to engage the wiper arm adapter (16), wherein the inner surface of the adapter unit (14) is an abutment face (24, 26) that extends at an oblique angle relative to the longitudinal center plane (22).

2. The wiper blade adapter device as claimed in claim 1, wherein the locking means (18, 20) is a first locking means (18), wherein the wiper blade adapter device further comprises a second locking means (20) that includes an elongate arm, wherein a distal end of the second locking means (20) is configured, during assembly with the adapter base member (10), to be deflected at least partially in the direction of the first locking means (18).

3. The wiper blade adapter device as claimed in claim 2, wherein the abutment face (24, 26) is a first abutment face, wherein the first locking means (18) has the first abutment face (24) and the second locking means (20) has a second abutment face (26), wherein the first and second abutment faces (24, 26) are configured for abutment against the wiper arm adapter (16) and, in a non-deflected state, have a spacing (28) with respect to each other which is configured to at least substantially correspond to a width (30) of the wiper arm adapter (16).

4. The wiper blade adapter device as claimed in claim 3, wherein the first and second abutment faces (24, 26) define relative to the wiping direction (64) an angle of at least substantially 45°.

5. A system having the wiper blade adapter device as claimed in claim 3 and having the wiper arm adapter (16), wherein the spacing (28) at least substantially corresponds to the width (30) of the wiper arm adapter (16).

6. The system as claimed in claim 5, wherein the first locking means (18) is configured to extend generally parallel to the longitudinal center plane (22) after snapping back toward the inner surface.

7. The wiper blade adapter device as claimed in claim 2, wherein the first locking means (18) and the second locking means (20) define a receiving space (78) for positive-locking receiving of the wiper arm adapter (16).

8. The wiper blade adapter device as claimed in claim 1, wherein the adapter unit (14) includes a side wall (80, 82) which is configured to cover the locking means (18, 20) in the wiping direction (64).

9. A wiper blade (32) having a wiper blade adapter device as claimed in claim 1.

10. A system having a wiper blade adapter device as claimed in claim 1, and further comprising the wiper arm adapter (16), wherein the wiper arm adapter (16) is engaged with the inner surface of the adapter unit (14) and is configured to block a deflection of the locking means (18, 20).

11. A method for assembling a wiper blade adapter device as claimed in claim 1, with a wiper arm adapter (16), characterized in that the locking means (18, 20) of the adapter unit (14) of the wiper blade adapter device is deflected during the assembly in the direction of the longitudinal center plane (22) of the adapter unit (14).

12. A wiper blade adapter device comprising:
an adapter base member (10) which is configured to be securely connected to a wiper blade component (12), the adapter base member (10) having a connection element (66, 68); and
an adapter unit (14) which is configured for releasable coupling to a wiper arm adapter (16), wherein the adapter unit (14) is configured to be connected to the adapter base member (10),
wherein the adapter unit (14) includes a locking means (18, 20) for engagement with the connection element (66, 68) of the adapter base member (10), wherein the locking means (18, 20) includes an elongate arm, wherein a distal end of the elongate arm is configured, during assembly with the adapter base member (10), to be deflected at least partially along a wiping direction (64) toward a longitudinal center plane (22) of the adapter unit (14), wherein the longitudinal center plane (22) extends through a center of gravity (90) of the adapter base member (10), wherein the wiping direction (64) extends perpendicular to the longitudinal center plane (22), wherein the locking means (18, 20) is a first locking means (18), wherein the wiper blade adapter device further comprises a second locking means (20) that includes an elongate arm, wherein a distal end of the second locking means (20) is configured, during assembly with the adapter base member (10), to be deflected at least partially in the direction of the first locking means (18), wherein the first locking means (18) has an abutment face (24) and the second locking means (20) has an abutment face (26), wherein the abutment faces (24, 26) are configured for abutment against the wiper arm adapter (16) and, in a non-deflected state, have a spacing (28) with respect to each other which is configured to at least substantially correspond to a width (30) of the wiper arm adapter (16), wherein each of the abutment faces (24, 26) extends at an oblique angle relative to the longitudinal center plane (22).

13. The wiper blade adapter device as claimed in claim 12, wherein the abutment faces (24, 26) define relative to the wiping direction (64) an angle of at least substantially 45°.

14. A system having the wiper blade adapter device as claimed in claim 12, and having the wiper arm adapter (16), wherein the spacing (28) at least substantially corresponds to the width (30) of the wiper arm adapter (16).

15. The system as claimed in claim 14, wherein the width (30) is measured along a direction that is oblique to the longitudinal center plane (22).

16. The wiper blade adapter device as claimed in claim 12, wherein the first locking means (18) is configured to extend generally parallel to the longitudinal center plane (22) after snapping back toward the inner surface.

17. The wiper blade adapter device as claimed in claim 12, wherein the first locking means (18) and the second locking means (20) define a receiving space (78) for positive-locking receiving of the wiper arm adapter (16).

18. The wiper blade adapter device as claimed in claim 12, wherein the adapter unit (14) includes a side wall (80) which is configured to cover the first locking means (18) in the wiping direction (64).

19. A wiper blade (32) having a wiper blade adapter device as claimed in claim 12.

20. A method for assembling a wiper blade adapter device as claimed in claim 12, with a wiper arm adapter (16), characterized in that the first locking means (18) of the adapter unit (14) of the wiper blade adapter device is deflected during the assembly in the direction of the longitudinal center plane (22) of the adapter unit (14).

* * * * *